(12) United States Patent
Van Dyke et al.

(10) Patent No.: US 7,463,266 B2
(45) Date of Patent: Dec. 9, 2008

(54) LOW OVERHEAD SERIAL INTERFACE

(75) Inventors: Phil Van Dyke, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 538 days.

(21) Appl. No.: 11/176,095

(22) Filed: Jul. 7, 2005

(65) Prior Publication Data
US 2007/0011369 A1    Jan. 11, 2007

(51) Int. Cl.
*G06F 13/14* (2006.01)
(52) U.S. Cl. ........................ 345/520; 345/519
(58) Field of Classification Search ................ 345/501, 345/520, 519
See application file for complete search history.

(56) References Cited

U.S. PATENT DOCUMENTS

| | | | |
|---|---|---|---|
| 5,512,921 A | | 4/1996 | Mital et al. |
| 5,539,401 A | * | 7/1996 | Kumaki et al. ................ 341/67 |
| 5,717,787 A | | 2/1998 | Feo et al. |
| 6,091,645 A | * | 7/2000 | Iadanza ................ 365/189.02 |
| 6,281,816 B1 | | 8/2001 | Kampf |
| 6,690,305 B2 | | 2/2004 | Meroth et al. |
| 6,744,388 B1 | | 6/2004 | Khu |
| 6,947,602 B2 | * | 9/2005 | Igarashi et al. ............. 382/235 |

OTHER PUBLICATIONS

Smith "Digital Transmission Systems", 1985, Van Nostrand Reinhold Company, pp. 190-197.*
"Image Data Compression By DCT With Adaptive Run-Length Coding", IEEE Transactions on Consumer Electronics, vol. 37, No. 4, Nov. 1991, (pp. 860-866).

* cited by examiner

*Primary Examiner*—Kee M Tung
*Assistant Examiner*—Daniel Washburn
(74) *Attorney, Agent, or Firm*—Mark P. Watson

(57) ABSTRACT

An interface for an integrated circuit chip is provided. The interface includes a first port configured to receive a command signal indicating whether command information or data is being transferred to the integrated circuit chip. The interface further includes a second port configured to receive the command information and the data. Coded data detection logic configured to detect a transition of the command signal indicating that the command information and the data are coded is provided. The transition of the command signal occurs subsequent to a first clock cycle indicating a type of access to the integrated circuit. A method for reducing overhead for a serial interface when receiving or transmitting data is also included.

13 Claims, 4 Drawing Sheets

LOW OVERHEAD SERIAL INTERFACE

BACKGROUND

In order to accommodate mechanical limitations and limited printed circuit board area, some electronic devices may utilize serial interface. For example, with a hinged cell phone, a serial interface may be used to limit the number of signals transmitted between processors to address these concerns. However, since a serial interface has only one data line for sending and receiving data, the various cycles must be split up in order to communicate which type of cycle is occurring, what address data is being read from or written to, and the data that is being transferred.

While the serial interface reduces the amount of signal lines and addresses the above concerns, there is a tradeoff. That is, the reduction of the amount of signals comes at the expense of performance, as the data must be sent serially instead of in parallel. Multiple cycles are needed to transmit a word of data rather than a single cycle as may be done with a parallel interface. The width of the serial interface, i.e., the amount of bits sent during each of the command, address, or data cycles, may vary for different devices. However, for any serial interface, irrespective of the width, the performance hit caused by the serial nature of the data transmission may become noticeable and even annoying to a user.

In view of the foregoing, there is a need to provide an apparatus and a method for communicating data over a serial interface in a more efficient manner that reduces the amount of clock cycles required for the data transmission.

SUMMARY

Broadly speaking, the present invention fills these needs by providing a system in which coded data sequences are assigned to frequently used commands or memory accesses. It should be appreciated that the present invention can be implemented in numerous ways, including as a method, a system, or a device. Several inventive embodiments of the present invention are described below.

In accordance with one embodiment of the invention, a graphics controller, is provided. The graphics controller includes a memory and a serial interface for receiving coded serial data. The serial interface includes coded data detection logic configured to detect a transition of a command signal subsequent to receipt of a command code selecting the graphics controller. The serial interface also includes decode circuitry configured to decode the coded serial data in response to the transition of the command signal. A bus enabling communication between the memory and the serial interface is also included.

In accordance with another embodiment of the present invention, an interface for an integrated circuit chip is provided. The interface includes a first port configured to receive a command signal indicating whether command information or data is being transferred to the integrated circuit chip. The interface further includes a second port configured to receive the command information and the data. Coded data detection logic configured to detect a transition of the command signal indicating that the command information and the data are coded is provided. The transition of the command signal occurs subsequent to a first clock cycle indicating a type of access to the integrated circuit.

In accordance with yet another embodiment of the present invention, a method for reducing overhead for a serial interface when receiving data is provided. The method initiates with assigning a value represented by multiple bits to a command to be received by the serial interface, wherein the value is represented by a maximum of two redundant portions. The method includes receiving a signal at a first logical state indicating a command type during a first clock cycle. Then, the signal indicating the command type is transitioned to a second logical state to indicate the command is coded, as well as a number of clock cycles needed to receive the command. A most significant bit value of the coded command is then received, and contemporaneously with receiving the most significant bit value the method includes, receiving a bit sequence indicating a number of times the most significant bit value is repeated in the coded command.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for methods and apparatuses for reducing overhead associated with a serial interface. It will be obvious, however, to one skilled in the art, that the present invention may be practiced without some or all of these specific details. In other instances, well known process operations have not been described in detail in order not to unnecessarily obscure the present invention.

The embodiments described herein provide a method and apparatus where commonly accessed registers and common commands are assigned addresses that correspond to bit sequences having repeating portions. Through the assignment of the bit sequences having repeating portions, it becomes possible to encode these bit sequences so that a reduced amount of data is sent over the serial interface. The amount of data sent over the serial interface exploits the fact that the bit sequences are limited to bit sequences that have a maximum of two repeating portions. Thus, the bit sequences are structured such that a most significant bit (MSB) may be repeated for the entire bit sequence, part of the bit sequence or not at all. However, if the MSB is repeated for part of the bit sequence or not at all, then the remaining bits of the bit sequence do not vary once again. That is, the remaining bits will not switch back to the MSB. Consequently, the embodiments described herein encode bit sequences that have a maximum of two redundant portions as described in more detail below and illustrated with reference to Table 1. These repeating sequences may be transmitted much more efficiently by a coded data value that identifies the MSB and how many times the MSB repeats.

Figure 1:
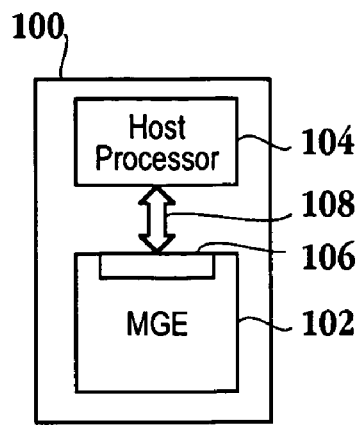
FIG. 1 is a high level simplified schematic diagram illustrating a device incorporating a mobile graphics engine in communication with the host processor in accordance with one embodiment of the invention.

FIG. 1 is a high level simplified schematic diagram illustrating a device incorporating a mobile graphics engine in communication with the host processor in accordance with one embodiment of the invention. Device 100 includes mobile graphics engine (MGE) 102 and host processor 104. Host processor 104 and MGE 102 communicate over bus 108. MGE 102 further includes interface 106 which is configured to receive data from host processor 104 and also to transfer data to the host processor. It should be appreciated that host processor 104 also includes an interface through which data is received and transmitted. The embodiments of the current invention apply to a serial interface, i.e., interface 106 is a serial interface. Furthermore, one skilled in the art will appreciate that host processor 104 may have a serial interface with complementary components as described herein for interface 106. However, for ease of illustration, the complementary components of the serial interface associated with host processor 104 are not shown. It should be noted that host processor 104 is configured to provide signals to MGE 102 conforming to the embodiments described herein.

It will be apparent to one skilled in the art that device 100 of FIG. 1 may be any suitable portable electronic information device, e.g., cellular telephone, personal digital assistant, web tablet, pocket personal computer, etc. Additionally, device 100 may have other features included thereon, e.g., camera functionality, wireless Internet capability, etc. One skilled in the art will appreciate that while the embodiments described below focus on a 16-bit serial interface, the invention may be extended to any size serial interface, e.g., an 8-bit or a 32 bit serial interface.

Figure 2:
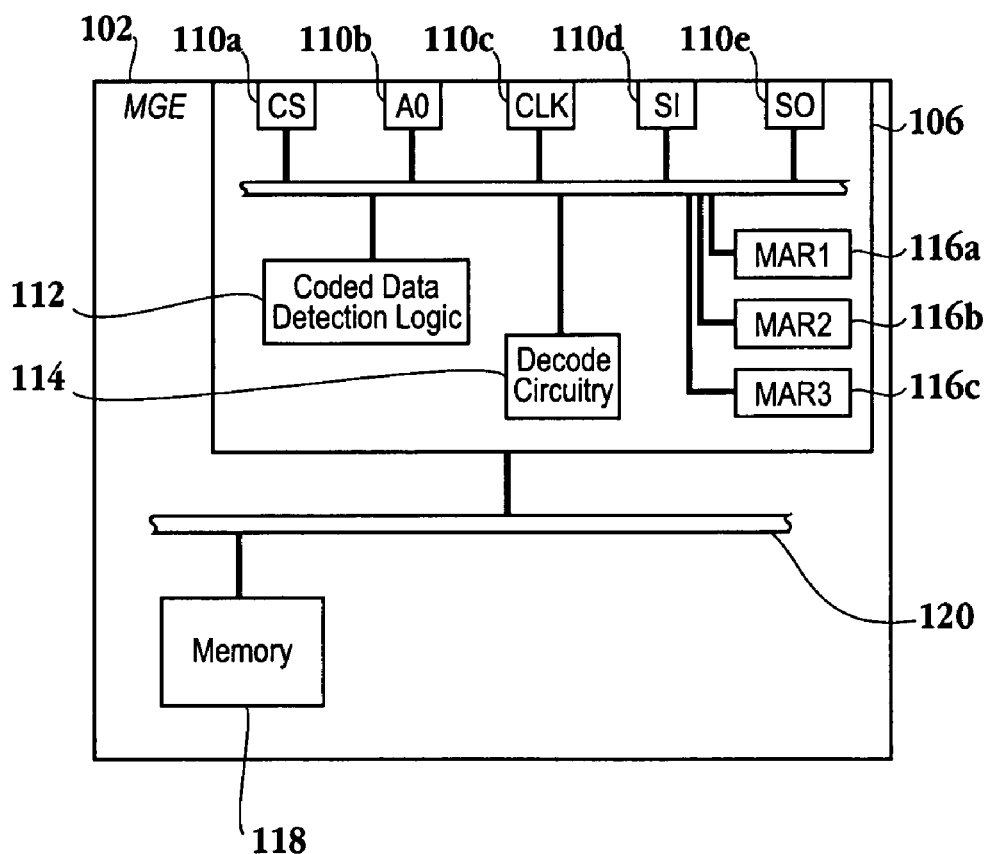
FIG. 2 is a more detailed schematic diagram illustrating the serial interface of the mobile graphics engine in accordance with one embodiment of the invention.

FIG. 2 is a more detailed schematic diagram illustrating the serial interface of the mobile graphics engine in accordance with one embodiment of the invention. MGE 102 includes serial interface 106 and memory 118. Serial interface 106 includes ports 110a through 110e. It should be appreciated that the term "ports" as used herein may also be referred to as "pins." That is, ports 110a through 110e may be referred to as pins 110a through 110e. Ports 110a-110e are associated with a chip select signal, a command signal, a clock signal, a data-in signal and a data-out signal, respectively, in accordance with one embodiment of the invention. Interface 106 further includes coded data detection logic 112. Coded data detection logic 112 includes logic functioning to detect that coded data is coming into serial interface 106. In one embodiment, coded data detection logic is configured to detect that a command signal received through port 110b has transitioned from a first logical state to a second logical state, e.g., switched polarity, subsequent to a first clock cycle during a transfer operation. Additionally, the clock cycle length for the serial transfer of the coded data will be determined based on the serial bit bus size of serial interface 106.

As will be explained in more detail below, the coded data enables a reduction in the overhead of the serial interface by reducing the number of clock cycles required to transfer data, especially data that may be routinely transferred between the host processor and the mobile graphics engine. Decode circuitry 114 of FIG. 2 is also included in serial interface 106. Decode circuitry 114 will be explained in further detail with reference to FIG. 3. It should be appreciated that decode circuitry 114 functions to decode the coded value to provide a 16-bit value, in the case where the serial bus interface is a 16-bit serial bus interface. Serial interface 106 further includes memory address registers 1, 2, and 3 116a through 116c.

In one embodiment, where serial interface 106 is a 16-bit serial interface, in order to access a greater memory range than 16-bits allows in the address cycle, the serial interface includes two 16-bit memory address registers (MAR), which can be programmed with a 32-bit address. A third register acts as a data port to this address that is programmed to the other two memory address registers. Whenever the data port, i.e., the third register, is accessed, the data transfer occurs to or from the address programmed in the memory address registers. It should be appreciated that the address programmed in the memory address registers may refer to an address of memory 118. Registers 116a through 116c can also be assigned one of the 32 data values for a 16-bit interface that can be coded to optimize the serial interface performance. Exemplary data values are listed in Table 1. Ports 110a through 110e, memory registers 116a through 116c, decode circuitry 114, and coded data detection logic 112 are all capable of communicating with each other. In addition, memory 118 is in communication with serial interface 106 over bus 120.

Figure 3:
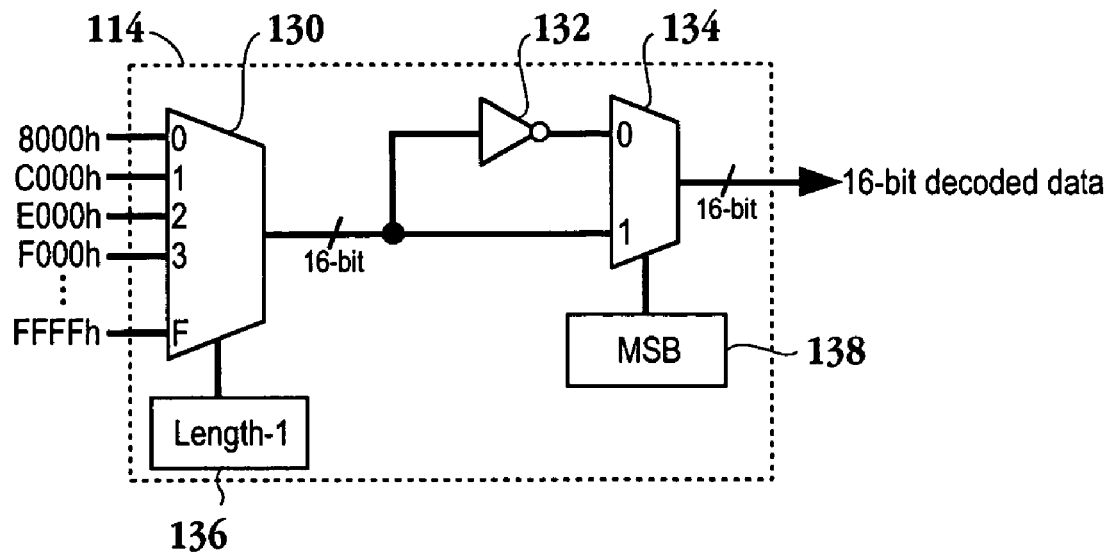
FIG. 3 is a simplified schematic diagram illustrating the decode circuitry included within the serial interface in accordance with one embodiment of the invention.

FIG. 3 is a simplified schematic diagram illustrating the decode circuitry included within the serial interface in accordance with one embodiment of the invention. Decode circuitry 114 includes multiplexer 130 having inputs 0-F and associated select signal 136. It should be noted that for a 16-bit serial interface the number of inputs will be 16, for a 32 bit serial interface the number of inputs will be 32, and for an 8-bit interface the number of inputs will be 8. Table 1 illustrates exemplary binary bit sequences that may be used for a sixteen bit serial interface in accordance with one embodiment of the invention.

TABLE 1

| Repeating bit sequence having a maximum of two redundant portions | Inverse of repeating bit sequence having a maximum of two redundant portions |
| --- | --- |
| 0000 0000 0000 0000 | 1111 1111 1111 1111 |
| 0000 0000 0000 0001 | 1111 1111 1111 1110 |
| 0000 0000 0000 0011 | 1111 1111 1111 1100 |
| 0000 0000 0000 0111 | 1111 1111 1111 1000 |
| 0000 0000 0000 1111 | 1111 1111 1111 0000 |
| 0000 0000 0001 1111 | 1111 1111 1110 0000 |
| 0000 0000 0011 1111 | 1111 1111 1100 0000 |
| 0000 0000 0111 1111 | 1111 1111 1000 0000 |
| 0000 0000 1111 1111 | 1111 1111 0000 0000 |
| 0000 0001 1111 1111 | 1111 1110 0000 0000 |
| 0000 0011 1111 1111 | 1111 1100 0000 0000 |
| 0000 0111 1111 1111 | 1111 1000 0000 0000 |
| 0000 1111 1111 1111 | 1111 0000 0000 0000 |
| 0001 1111 1111 1111 | 1110 0000 0000 0000 |
| 0011 1111 1111 1111 | 1100 0000 0000 0000 |
| 0111 1111 1111 1111 | 1000 0000 0000 0000 |

As illustrated in Table 1, for a 16 bit interface there would be 32 data values that may be assigned to frequently accessed registers or frequently used commands. These 32 data values are capable of being coded as described herein in order to utilize four clock cycles to transmit the coded value rather than 16 clock cycles for the non-coded value for a 16-bit serial interface. One skilled in the art will appreciate that similar tables may be populated for an 8-bit serial interface, where 16 data values are available, and a 32-bit serial interface, where 64 data values are available. Similar to the 16 bit values in Table 1, the data values for the 8 bit serial interface and the 32 bit serial interface would have a maximum of two redundant portions.

Returning to FIG. 3, the output of multiplexer 130 is the input to multiplexer 134 and inverter 132. Multiplexer 134 is associated with select signal 138. Select signal 138 is the most significant bit (MSB) of the coded data represented in a binary format. The select signal 136 for multiplexer 130 is the length minus 1, where the length represents how many times that the most significant bit of the coded data is repeated. The following example illustrates the operation of decode circuitry 114. It should be appreciated that this example is not meant to be limiting and is presented for illustrative purposes. For this example, input data 0FFFh can be coded to 00011b, since the most significant bit is zero and there are four zeros in the sequence. That is, 0FFFh is represented by as 0000 1111 1111 1111 in binary, which can then be coded as the binary number 00011 under the convention described herein. The length bits, i.e., 0011b of the coded number, select input number 3 of multiplexer 130, which outputs a value of F000h. Multiplexer 134 then selects the input from inverter 132, as the most significant bit of the coded data value (00011b) is zero. The inverse of F000h is 0FFFh, which is the original data. Thus, the 16 data values in hexadecimal format are input into multiplexer 130, while the length, i.e., the number of times the MSB repeats (4), minus one, is used to select the appropriate input value. The selected value is then transmitted to multiplexer 134 and inverter 132. Inverter 132 inverts the selected value and provides the inverted value to multiplexer 130. It should be appreciated that since the selected data value and an inversion of the selected data value are presented to multiplexer 134, only 16 of the 32 values of Table 1 have to be input into multiplexer 130.

Figure 4:
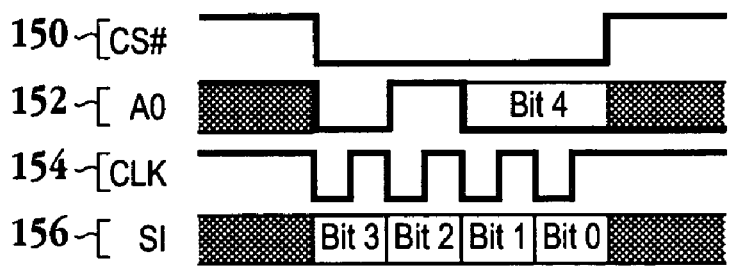
FIG. 4 is a simplified waveform illustrating the timing characteristics and the reduction in clock cycles for a 16-bit serial bus interface in accordance with one embodiment of the invention.

FIG. 4 is a simplified waveform illustrating the timing characteristics and the reduction in clock cycles for a 16-bit serial bus interface in accordance with one embodiment of the invention. Chip select signal 150 is driven low in order to select the mobile graphics engine (MGE), which may also be referred to as a graphics controller. It should be appreciated that the host processor generates chip select signal 150 in order to alert the graphics controller for data transfers. Command signal (A0) 152 is initially driven low in order to specify that the transfer is a command. In the case where the cycle is a data cycle, command signal 152 would be driven high. Thus, the first cycle signifies that the MGE is selected through chip select signal 150 and the type of cycle, i.e., a command or data cycle, through command signal 152. On the second clock cycle, the command signal 152 is driven high in order to signify that the data following will be coded data. As illustrated in FIG. 4, on the second clock cycle, command signal 152 switches polarity to signal that the data will be coded, and in the case of a 16-bit serial bus the cycle will be four clocks long to receive bits 0-4, the length bits. One skilled in the art will appreciate that if command signal 152 is initially high, the command signal would switch polarity to a low state to signify the data is coded. On the third clock cycle, command signal 152 will signify bit 4, i.e., the most significant bit (MSB) of the coded data value.

With reference to the example provided above in FIG. 3, the most significant bit is zero, therefore, command signal 152 is driven low. As illustrated in data in line (SI) 156 of FIG. 4, bits 0 through 3 are transferred during the four clock cycles illustrated in waveforms 154 and 156. Thus, rather than having to transfer the data in 16 clock cycles the coded data has been transferred in four clock cycles. It should be appreciated that the logical state of the signals shown in FIG. 4 are exemplary and not meant to be limiting. That is, the polarities of the signals may be reversed to achieve the same functionality, e.g., chip select signal 150 may be driven high to indicate that the MGE has been selected, and so on.

Figure 5:
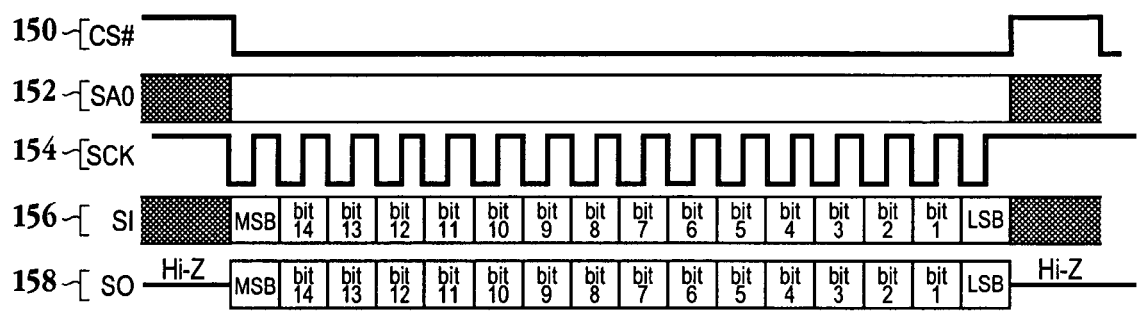
FIG. 5 is a simplified waveform diagram illustrating the transfer of data over a 16 bit serial interface without the coded data being utilized.

FIG. 5 is a simplified waveform diagram illustrating the transfer of data over a 16 bit serial interface without the coded data being utilized. As illustrated, similar to FIG. 4 chip select signal 150 is driven low while command signal 152 stays in one state depending on whether command or data is being transferred. However, in order to transfer a command or data, 16 clock cycles 154 will be needed for each bit on data in line 156 or when data is being transferred out as indicated in the data out line 158. When comparing FIGS. 4 and 5, the significant savings in overhead should be noted. With reference to a 16 bit serial interface, there would be 32 data values, i.e., those listed in Table 1, that may be assigned to frequently used command codes or commonly accessed registers. The coded data detection logic of FIG. 2 is configured to detect the transition of command signal 152 subsequent to a first clock cycle. In one embodiment, logic within the coded data detection logic samples command signal 152 on the first and second clock cycles and if the command signal changes polarity, the serial interface will be receiving coded data. It should be appreciated that the coded data detection logic of FIG. 2, may be hardware, software, or some combination of hardware and software.

Figure 6:
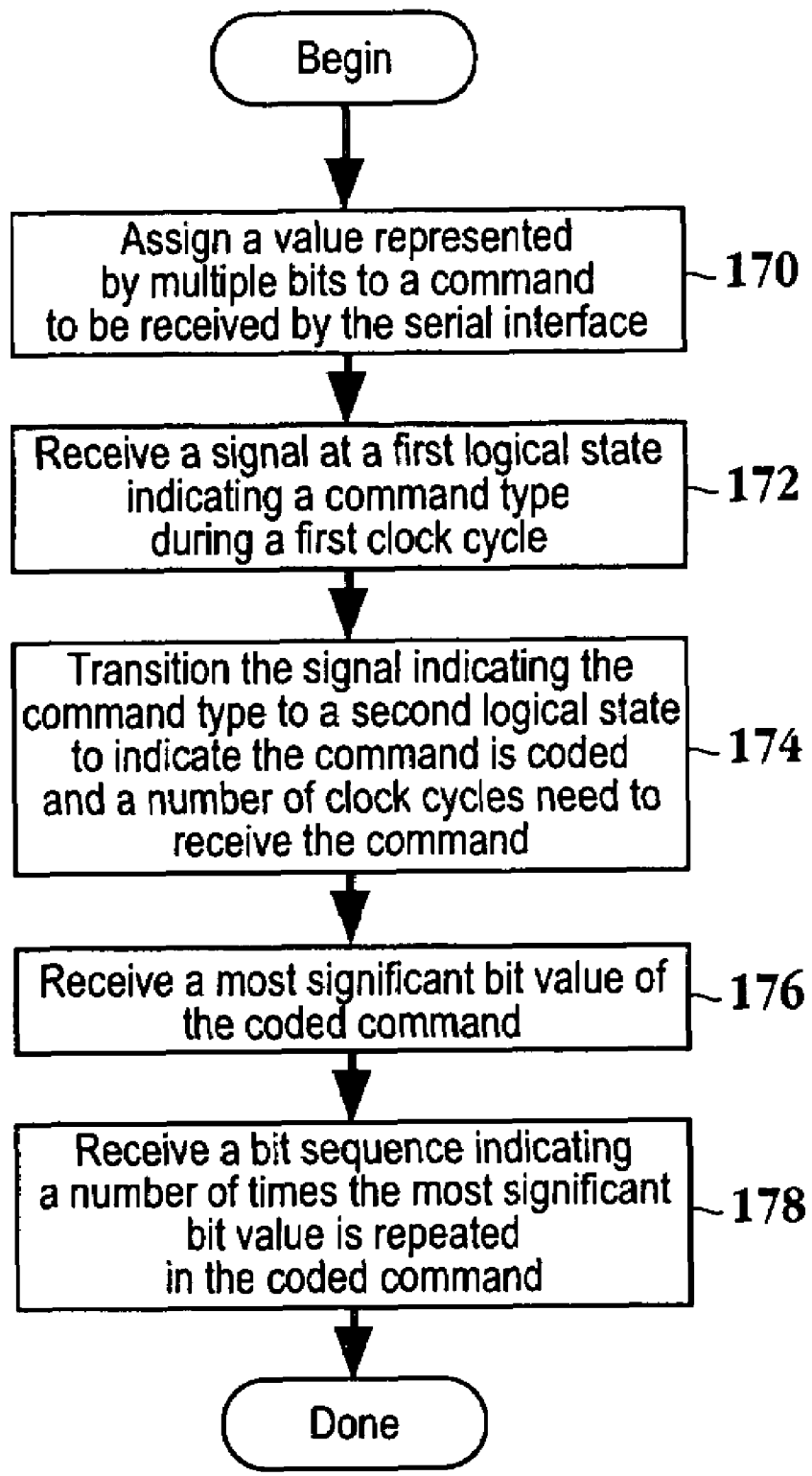
FIG. 6 is a flow chart diagram illustrating the method operations for reducing the overhead for a serial interface when receiving or transmitting data in accordance with one embodiment of the invention.

FIG. 6 is a flow chart diagram illustrating the method operations for reducing the overhead for a serial interface when receiving or transmitting data in accordance with one embodiment of the invention. The method initiates with operation 170 where a value represented by multiple bits is assigned to a command to be received by a serial interface. Here, the value includes a maximum of two redundant portions. For example, as discussed above, a most significant bit is assigned and then a length of bits in which the most significant bit is repeated is determined in order to enable the coded data sequence. It should be appreciated that after the number of repetitions for the most significant bit, the value for the remainder of the least significant bits in the sequence are all the inverse of the most significant bit as illustrated with reference to Table 1. Thus, there are a limited number of values that would follow this pattern. For a 16-bit serial interface there would be 32 values falling into this pattern. Of course, the embodiments are not limited to a 16-bit serial interface, as value patterns may be defined for an 8-bit, 32-bit, or any other suitable width serial interface.

The method then advances to operation 172 where a signal having a first logical state is received, thereby indicating a command type during a first clock cycle. It should be appreciated that the address command discussed above is the signal referred to in operation 172. The command type may be a command such as, a write command, a read command, an end command, or a status command. Alternatively, the command type may also indicate that data is being transferred. It should be noted that a state of a chip select signal is used to indicate to the chip that the host processor is selecting the chip for a data transfer. The method then proceeds to operation 174 where the signal indicating the command type is transitioned to a second logical state to indicate that the command is coded. In one embodiment, a number of clock cycles needed to receive the command will also be identified based on the width of the serial interface. As described above, the command signal will switch polarity in order to indicate that the command is coded. The switch in polarity will occur during a second clock cycle, i.e., a clock cycle subsequent to the clock cycle of operation 172. Logic within the serial interface will detect this transition. The method then moves to operation 176 where a most significant bit value of the coded command is received. Referring to FIG. 4, the most significant bit value will be received during a third clock cycle. The method then advances to operation 178 where a bit sequence, referred to above as the length, indicating a number of times the most significant bit value is repeated in the coded command is received. The bit sequence characterizes the number of times the most significant bit is repeated in the coded data. As discussed above, the remainder of the least significant bits following the amount of times the most significant bit is repeated will be the inverse of the most significant bit. The length of this remainder is dependent on the width of the serial interface.

It should be appreciated that while the above embodiments are described with reference to a 16-bit serial bus the embodiments can easily be extended to different size serial interfaces, e.g. an 8-bit or a 32-bit serial interface. Furthermore, by using the coded data values as described herein, the values can be sent serially in four clock cycles rather than 16 clock cycles. With respect to an 8-bit serial interface, there are 16 data values that may be sent serially in three clock cycles rather than 8 clock cycles. In addition, with respect to a 32-bit serial interface, there are 64 data values that can be sent serially in four clock cycles rather than 32 clock cycles. One skilled in the art will appreciate that since serial commands and memory address registers account for a significant proportion of the overhead and bandwidth on a serial interface, a substantial speed increase may be realized using the coded serial data scheme described herein. Furthermore, since the serial cycles are now only four clocks instead of 16, with respect to a 16-serial bus, power consumption will also be reduced because of the decreased bus activity between the host and the device.

With regard to a 32-bit serial interface, the command signal would transfer bits 5:4 and the data in or the data out lines would transfer bits 3:0, thereby also using four clock cycles to transfer the coded data value, similar to a 16-bit serial interface. For an 8-bit interface, the command signal would transfer bit 3 and the data-in or data-out line would transfer bits 2:0, thus three clocks are needed to transfer the coded data value. It should be appreciated that for normal data, the command signal remains unchanged, i.e. without toggling, throughout the command or data cycle as shown in FIG. 5.

In summary, the above-described invention provides a scheme for reducing the overhead and bandwidth in an embedded application associated with a serial interface. In one exemplary embodiment, the above-described scheme may apply where printed circuit board real estate is limited and mechanical considerations come into play, e.g., a cell phone having a hinge. The serial implementation described herein reduces the amount of clock cycles needed to transmit a given data size. With regard to a 16 bit serial bus, there are 32 data values that may be transmitted in 4 clock cycles rather than 16 clock cycles. These 32 data values may be assigned to data values frequently used on the serial interface, e.g., command codes. In another embodiment, memory address registers may be assigned the values that may be transmitted in four clock cycles. With regard to a 32 bit serial interface, there are 64 data values that may be transmitted serially in 4 clock cycles through the embodiments described above. With reference to an 8 bit serial interface, there would be 16 data values that could be transmitted serially in 3 clock cycles.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A graphics controller, comprising:
  a memory;
  a serial interface for receiving coded serial data, the serial interface including,
  coded data detection logic configured to detect a transition of a command signal subsequent to receipt of a command code selecting the graphics controller; and
  decode circuitry configured to decode the coded serial data in response to the transition of the command signal;
  a bus enabling communication between the memory and the serial interface;
  a first register; and
  a second register, wherein the first register acts as a data port for a memory address programmed into the second register;
  wherein the decode circuitry includes,
  a first multiplexer configured to select one of a plurality of inputs, the plurality of inputs including the coded serial data;
  a second multiplexer having two inputs, a first input being an output of the first multiplexer, a second input being an inverted output of the first multiplexer;
  wherein the first multiplexer is configured to select the one of the plurality of inputs according to a number of times a most significant bit of the coded serial data is repeated.

2. The graphics controller of claim 1, wherein when the first register is accessed, a data transfer occurs to or from the memory address of the memory.

3. The graphics controller of claim 1, wherein the serial interface further includes,
  a first port for receiving the command code;
  a second port for receiving the command signal;
  a third port for receiving a clock signal;
  a fourth port for receiving serial data; and
  a fifth port for transmitting serial data.

4. The graphics controller of claim 3, wherein the command code is a chip select signal.

5. An interface for an integrated circuit chip, comprising:
a first port configured to receive a command signal indicating whether command information or data is being transferred to the integrated circuit chip;
a second port configured to receive the command information and the data;
coded data detection logic configured to detect a transition of the command signal indicating that the command information and the data are coded, wherein the transition of the command signal occurs subsequent to a first clock cycle indicating a type of access to the integrated circuit; and
decode circuitry configured to decode the coded data and the coded command information in response to the transition of the command signal;
wherein the decode circuitry includes,
a first multiplexer configured to select one of a plurality of inputs, the plurality of inputs including one of the coded command information or the coded data;
a second multiplexer having two inputs, a first input being an output of the first multiplexer, a second input being an inverted output of the first multiplexer;
wherein the first multiplexer is configured to select the one of the plurality of inputs according to a number of times a most significant bit of one of the coded command information or the coded data is repeated and the second multiplexer is configured to select one of the two inputs according to a value of the most significant bit.

6. The interface of claim 5, further comprising:
a first, second, and a third register, wherein the first register acts as a data port for a memory address programmed into the second and third registers.

7. The interface of claim 5, wherein the interface is incorporated into a graphics controller.

8. A method for reducing overhead for a serial interface when receiving data, comprising method operations of:
assigning a value represented by multiple bits to a command to be received by the serial interface, wherein the value is represented by a maximum of two redundant portions;
receiving a signal at a first logical state indicating a command type during a first clock cycle;
transitioning the signal indicating the command type to a second logical state to indicate the command is coded and a number of clock cycles needed to receive the command;
receiving a most significant bit value of the coded command;
contemporaneously with receiving the most significant bit value the method includes,
receiving a bit sequence indicating a number of times the most significant bit value is repeated in the coded command.

9. The method of claim 8, wherein the most significant bit value is received through a command signal pin and the bit sequence is received through a data in pin.

10. The method of claim 8, further comprising:
decoding the coded command.

11. The method of claim 10, wherein the method operation of decoding the coded command includes,
selecting one of a plurality of code sequences according to the number of times the most significant bit is repeated; and
selecting between the one of the plurality of code sequences and an inverted value of the one of the plurality of code sequences based on the most significant bit value.

12. The method of claim 8, further comprising:
accessing a first memory register in the serial interface, the first memory register associated with the coded command; and
in response to accessing the first memory register, the method includes,
retrieving an external memory address from a second register of the serial interface; and
triggering a data transfer to the external memory address.

13. The method of claim 8, wherein the command is selected from the group consisting of a write command, a read command, an end command, and a status command.

* * * * *